United States Patent
Culp et al.

(10) Patent No.: US 9,898,573 B2
(45) Date of Patent: Feb. 20, 2018

(54) RULE AND PROCESS ASSUMPTION CO-OPTIMIZATION USING FEATURE-SPECIFIC LAYOUT-BASED STATISTICAL ANALYSES

(71) Applicant: GLOBALFOUNDRIES INC., Grand Cayman (KY)

(72) Inventors: James A. Culp, New Paltz, NY (US); Chieh-Yu Lin, San Diego, CA (US); Dongbing Shao, Wappingers, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 102 days.

(21) Appl. No.: 15/040,453

(22) Filed: Feb. 10, 2016

(65) Prior Publication Data
US 2017/0228491 A1    Aug. 10, 2017

(51) Int. Cl.
*G06F 17/50* (2006.01)

(52) U.S. Cl.
CPC ...... *G06F 17/5081* (2013.01); *G06F 17/5009* (2013.01); *G06F 2217/12* (2013.01); *G06F 2217/16* (2013.01)

(58) Field of Classification Search
CPC .................................................. G06F 17/5081
USPC ............................................................ 716/112
See application file for complete search history.

(56) References Cited

U.S. PATENT DOCUMENTS

| | | | |
|---|---|---|---|
| 5,987,240 A | 11/1999 | Kay | |
| 6,892,365 B2 | 5/2005 | Culp et al. | |
| 7,448,018 B2 | 11/2008 | Heng et al. | |
| 7,549,142 B2 | 6/2009 | Alvarez-Gomariz et al. | |
| 7,765,518 B2 | 7/2010 | De La Cruz et al. | |
| 7,861,195 B2 | 12/2010 | Chan et al. | |
| 8,347,255 B2 | 1/2013 | Agrawal | |
| 8,793,627 B1 | 7/2014 | Stephens et al. | |
| 2003/0200513 A1* | 10/2003 | Bergman Reuter | G06F 17/5081 716/52 |

(Continued)

OTHER PUBLICATIONS

Hibbeler et al., "Moving Carefully Towards Model-Based Layout Optimization and Checking", IEEE/SEMI Advanced Semiconductor Manufacturing Conference (ASMC 2007) Jun. 2007, pp. 24-28.

(Continued)

*Primary Examiner* — Suchin Parihar
(74) *Attorney, Agent, or Firm* — Gibb & Riley, LLC; David A. Cain, Esq.

(57) ABSTRACT

Disclosed are methods, systems and computer program products that, during new technology node development, perform design rule and process assumption co-optimization using feature-specific layout-based statistical analyses. Specifically, the layout of a given feature can be analyzed to determine whether it complies with all of the currently established design rules in the new technology node. When the layout fails to comply with a current design rule, statistical analyses (e.g., Monte-Carlo simulations) of images, which are generated based on the layout and which illustrate different tolerances for and between the various shapes in the layout given current process assumption(s), can be performed. Based on the results of the analyses, the current process assumption(s) and/or the design rule itself can be adjusted using a co-optimization process in order to ensure the manufacturability of the feature within the technology.

20 Claims, 6 Drawing Sheets

(56) References Cited

U.S. PATENT DOCUMENTS

2009/0193369 A1* 7/2009 Chan .................. G06F 17/5081
716/106
2010/0242000 A1* 9/2010 Strenski ............. G06F 17/5068
716/136
2016/0217233 A1* 7/2016 Kamon ............... G06F 17/5068

OTHER PUBLICATIONS

Paek et al., "Enhance Layout Optimization of Sub-45nm Standard, Memory Cells and Its Effects", SPIE Proceedings vol. 7275: Designing for Manufacturability Through Design-Process Integration III, Mar. 2009, pp. 1-9.

* cited by examiner

RULE AND PROCESS ASSUMPTION CO-OPTIMIZATION USING FEATURE-SPECIFIC LAYOUT-BASED STATISTICAL ANALYSES

FIELD OF THE INVENTION

The present invention relates to establishing and refining technology node design rules and process assumptions and, more particularly, to methods, system and computer program products that perform design rule and process assumption co-optimization using feature-specific layout-based statistical analyses.

BACKGROUND

Those skilled in the art will recognize that a technology node (also referred to as a process node) is typically identified in nanometers (e.g., a 45 nm, 32 nm, 22 nm, 14 nm, etc.), thereby indicating the size of the semiconductor features that can be formed on a wafer using the technology. The technology node may also indicate the type of wafer, such as a silicon-on-insulator (SOI) wafer (e.g., 45 nm SOI, 32 nm SOI, 22 nm SOI, etc.). In any case, each technology node is associated with sets of design rules (also referred to as sets of ground rules, rule decks, run sets, etc.) that are incorporated into a process design kit (PDK) and applied during particular stages in the design flow (e.g., at power planning, at input/output pin placement, at library element placement, at clock planning, at wire routing, etc.) in order to ensure optimal manufacturability (i.e., in order to ensure that the intended functionality of an IC design can be achieved with a high degree of yield). Such design rules can, for example, include geometric constraints (also referred to as tolerances) on the mask patterns used at the various levels of an IC design layout. That is, such design rules can place constraints on the mask patterns used at each level both individually and in combination with the mask patterns in the levels above and/or below. Thus, the design rules for a technology node can include intra-level rules that specify minimum and maximum shape length, width and overall area, minimum and maximum spacing between shapes, allowable shape orientations, etc. The design rules for a technology node can also include inter-level rules that specify the minimum and maximum distance between shapes in different levels, minimum and maximum overlay, etc. Unfortunately, as device sizes continue to decrease and device density continues to increase with each new technology node, techniques for accurately determining the optimal design rules are becoming ever more difficult and time-consuming.

SUMMARY

In view of the foregoing, disclosed herein are methods, systems and computer program products that, during new technology node development, perform design rule and process assumption co-optimization using feature-specific layout-based statistical analyses. Specifically, the layout of a given feature can be analyzed to determine whether it complies with all of the currently established design rules in the new technology node. When the layout fails to comply with a current design rule, statistical analyses (e.g., Monte-Carlo simulations) of images, which are generated based on the layout and which illustrate different tolerances for and between the various shapes in the layout given current process assumption(s), can be performed. Based on the results of the analyses, the current process assumption(s) and/or the design rule itself can be adjusted using a co-optimization process in order to ensure the manufacturability of the feature within the technology.

More particularly, disclosed herein are methods that, during new technology node development, perform design rule and process assumption co-optimization using feature-specific layout-based statistical analyses. In the methods, an inquiry regarding manufacturability of a feature in the new technology node can be received (e.g., by a processor from a user through a user interface). This feature can be defined in a layout containing multiple shapes at different design levels. In response to the inquiry, design information, which is stored in memory, can be accessed (e.g., by the processor). This design information can include, but is not limited to, a list of fail mechanisms, a list of current process assumptions and a process design kit (PDK), which includes a list of current design rules for the new technology node. Using this design information, a design rule checking process can be performed. That is, the layout of the feature at issue can be analyzed (e.g., by the processor) to determine whether it complies with all of the current design rules. When the layout fails to comply with one or more of the current design rules, the following processes can be performed (e.g., by the processor): selecting at least one fail mechanism associated with the design rule(s) at issue and selecting at least one current process assumption associated with each selected fail mechanism; generating multiple different images of the feature with different tolerances for and between the shapes given the selected process assumption(s); analyzing the images (i.e., performing statistical analyses, such as Monte-Carlo simulations, of the images); and, based on the results of the statistical analyses, adjusting the selected process assumption(s) and/or the design rule(s) at issue in a co-optimization process. Once the selected process assumption(s) and/or the design rule(s) at issue are adjusted and a determination is made that the feature will pass subsequent design rule checking given the adjusted process assumption(s) and/or adjusted design rule(s), the PDK for the new technology node can be updated to incorporate the feature and any adjusted design rules.

Also disclosed herein are systems that, during new technology node development, perform design rule and process assumption co-optimization using feature-specific layout-based statistical analyses. Each system can incorporate at least a memory, a user interface and at least one processor in communication with the user interface. The memory can store design information. This design information can include, but is not limited to, a list of fail mechanisms, a list of current process assumptions and a process design kit (PDK), which includes a list of current design rules for the new technology node. The user interface can receive an inquiry from a user regarding the manufacturability of a feature in the new technology node. This feature can be defined in a layout containing multiple shapes at different design levels. The processor can, in response to the inquiry, access the design information from a memory and perform a design rule checking process. Specifically, the processor can analyze the layout of the feature to determine whether the layout complies with all of the current design rules. When the layout fails to comply with one or more of the current design rules, the processor can select at least one fail mechanism associated with the design rule(s) at issue and at least one current process assumption associated with each selected fail mechanism; generate multiple different images of the feature with different tolerances for and between the shapes given the selected process assumption(s); analyze the images (i.e., perform statistical analyses, such as Monte-Carlo simulations, of the images); and, based on the results of the statistical analyses, adjust the selected process assumption(s) and/or the design rule(s) at issue in a co-optimization process. Once the selected process assumption(s) and/or the design rule(s) at issue are adjusted and a determination is made that the feature will pass subsequent design rule checking given the adjusted process assumption(s) and/or adjusted design rule(s), the processor can update the PDK for the new technology node to incorporate the feature and any adjusted design rules.

Also disclosed herein are computer program products that, during new technology node development, perform design rule and process assumption co-optimization using feature-specific layout-based statistical analyses. Specifically, the computer program products can be implemented on a computer readable storage medium having program instructions tangibly embodied thereon. The program instructions can be executable by at least one processor to perform the above-described method.

BRIEF DESCRIPTION OF THE SEVERAL VIEWS OF THE DRAWINGS

The present invention will be better understood from the following detailed description with reference to the drawings, which are not necessarily drawn to scale and in which.

DETAILED DESCRIPTION

Figure 1:
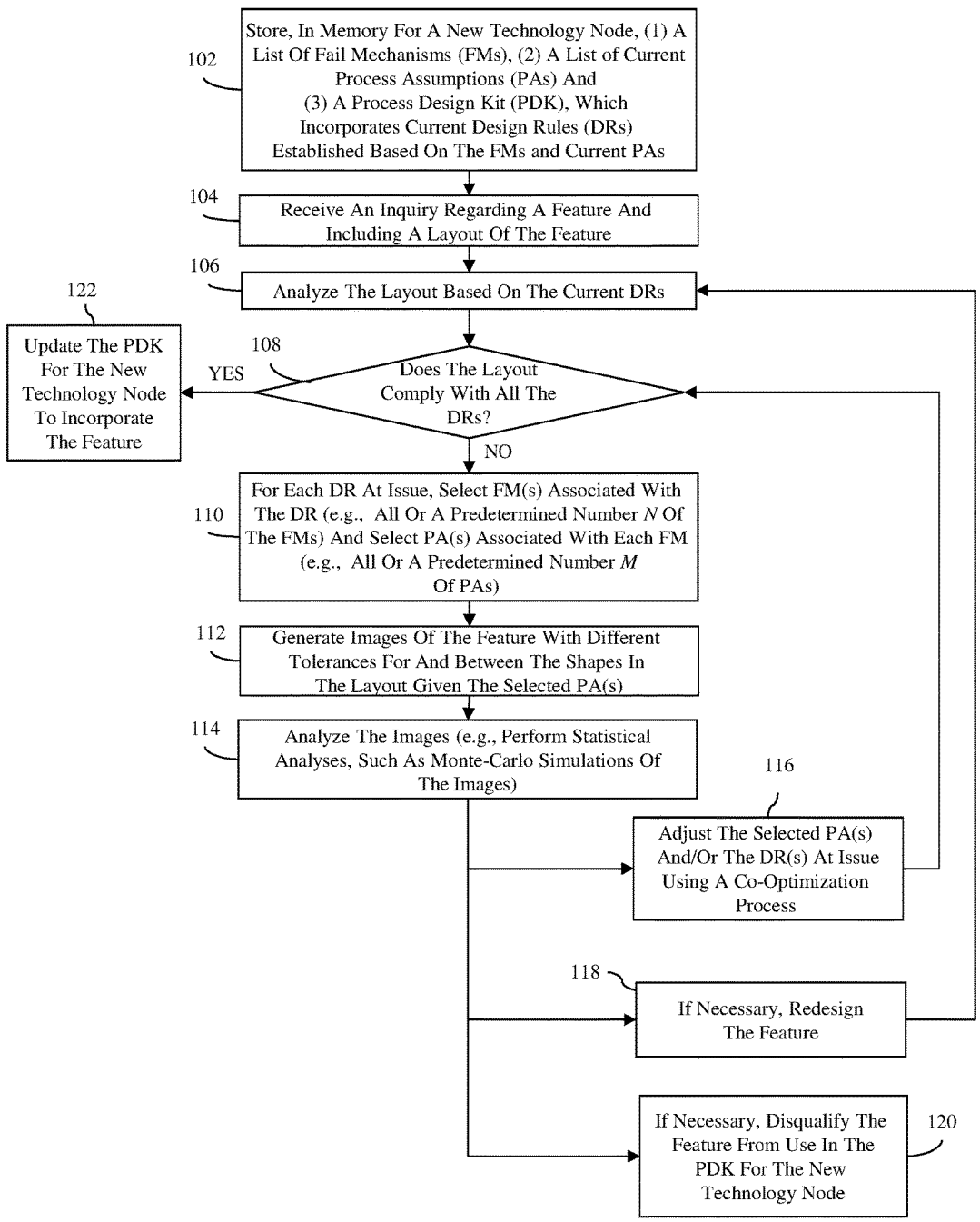
FIG. 1 is a flow diagram illustrating the disclosed methods that, during new technology node development, perform design rule and process assumption co-optimization using feature-specific layout-based statistical analyses.

As mentioned above, as device sizes continue to decrease and device density continues to increase with each new technology node, techniques for accurately determining optimal design rules are becoming ever more difficult and time-consuming.

More specifically, design rules for a new technology node are typically determined based on a set of process assumptions associated with that technology node and with various fail mechanisms that can occur in light of those process assumptions. Process assumptions (also referred to herein as process parameter assumptions) include predictions made regarding parameters associated with the processes performed at the various levels of IC design and the expected variations in those parameters. For example, process assumptions can include, but are not limited to, minimum and maximum dimensions for each layer in a gate stack, minimum and maximum dimensions for each dielectric layer, minimum and maximum dimensions for each conductive layer, etc. Process assumptions can also include estimations for the overlay accuracy of the alignment tools used in the masking process. For mask patterns printed on a wafer, the fail mechanisms or, more particularly, the resulting conditions that can lead to fails include, but are not limited to, a less than minimum required insulation for a shape, shapes touching that should not touch or shapes not touching that should touch, shapes being covered or not be covered, the overlap area of shapes being too great or too small, the angles of the shape surfaces being too great or too small, etc.

During the early stages of new technology node development, process assumptions are often determined based on corresponding process assumptions in a previous technology node because no hardware is available for testing. However, those skilled in the art will recognize that with continued device scaling there is not always a direct correlation between the process assumptions from one technology node to the next. For example, although devices in a new technology node may be approximately X % smaller than devices in a previous technology node, the nominal thickness of each layer in the device will not necessarily be X % smaller. Those skilled in the art will also recognize that newer technology nodes often use multiple lithographic exposures define the mask pattern for a given design level and the multiple lithographic exposures increase the probability of alignment and overlay issues. Full Monte-Carlo simulations of all of the lithographic exposures can be performed in order to acquire process assumptions on which design rules are based; however, such simulations can be extremely complex and can take an inordinate amount of time. Current techniques that avoid the use of full Monte-Carlo simulations often result in either process assumptions that are too pessimistic or process assumptions that are too optimistic. If the process assumptions and, thereby the design rules, are too pessimistic, some features may be unnecessarily excluded from the technology node process design kit (PDK); whereas, if the process assumptions and, thereby the design rules, are too optimistic, some features that are included in the technology node PDK may cause a higher than acceptable percentage of fails, resulting in low yield. Consequently, there is a need in the art for a technique of developing design rules for a new technology node that avoids the use of full Monte-Carlo simulations, but still produces process assumptions and design rules that are neither too pessimistic, nor too optimistic.

In view of the foregoing, disclosed herein are methods, systems and computer program products that, during new technology node development, perform design rule and process assumption co-optimization using feature-specific layout-based statistical analyses. Specifically, the layout of a given feature can be analyzed to determine whether it complies with all of the currently established design rules in the new technology node. When the layout fails to comply with a current design rule, statistical analyses (e.g., Monte-Carlo simulations) of images, which are generated based on the layout and which illustrate different tolerances for and between the various shapes in the layout given current process assumption(s), can be performed. Based on the results of the analyses, the current process assumption(s) and/or the design rule itself can be adjusted using a co-optimization process in order to ensure the manufacturability of the feature within the technology.

More particularly, referring to FIG. 1, disclosed herein are methods that, during new technology node development, perform design rule and process assumption co-optimization using feature-specific layout-based statistical analyses. In the methods, design information specific to the new technology node can be stored in memory (102). This design information can include a list of fail mechanisms and a list of current process assumptions for the new technology node. As discussed above, process assumptions can include, but are not limited to, minimum and maximum dimensions for each layer in a gate stack, minimum and maximum dimensions for each dielectric layer, minimum and maximum dimensions for each conductive layer, etc. Process assumptions can also include estimations for the overlay accuracy of the alignment tools used in the masking process. The fail mechanisms (i.e., the conditions that can lead to fails) can include, but are not limited to, a less than minimum required insulation for a shape, shapes touching that should not touch or shapes not touching that should touch, shapes being covered or not be covered, the overlap area of shapes being too great or too small, the angles of the shape surfaces being too great or too small, etc. The lists of fail mechanisms and current process assumptions can initially be determined, for example, based on corresponding lists of fail mechanisms and process assumptions available for a previous technology node. The design information can also include a process design kit (PDK), which incorporates current design rules that have been established for the new technology node based on the previously mentioned lists of fail mechanisms and current process assumptions. Those skilled in the art will recognize that a PDK also typically includes various other sets of files including, but not limited to, technology files for the new technology node and a library element library. The library element library can list multiple different library elements (also referred to as cells or standard cells) that can be incorporated into an IC under design in the specific technology node and, specifically, can contain library files (.libs) for each of those library elements. A given library element can represent a single device with specific features or can represent a set of devices with specific features and the interconnect structure(s) that connect those devices.

In the methods, an inquiry regarding manufacturability of a specific feature in the new technology node can be received (e.g., by a processor from a user and, particularly, from a designer, through a user interface) (104). The inquiry can identify the specific feature. The specific feature can be defined (i.e., represented) in the inquiry by a layout containing multiple shapes at different design levels. The inquiry can further ask if the specific feature will be able to be incorporated into an integrated circuit (IC) design in the new technology node (i.e., can ask if the PDK for the new technology allows for incorporation of the specific feature into an IC design).

Figure 2:
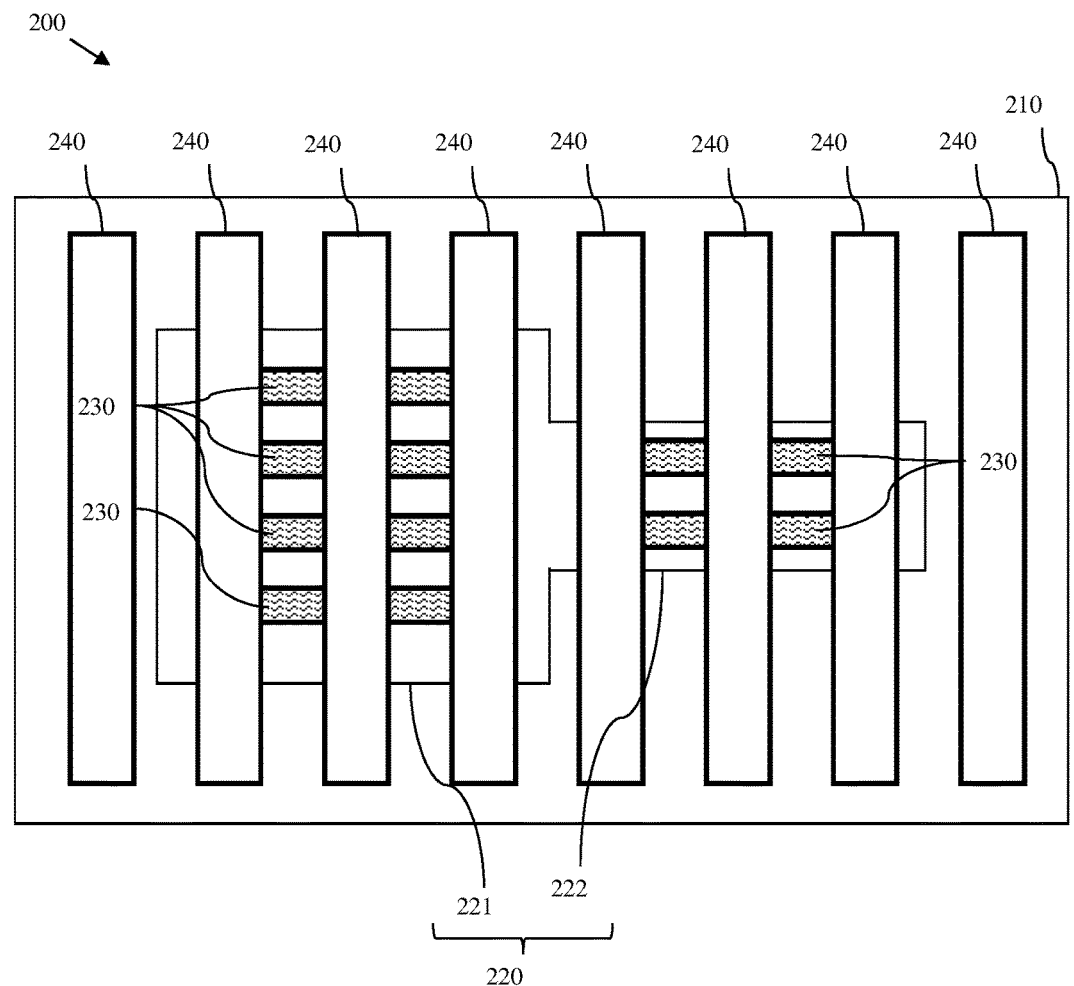
FIG. 2 is a diagram illustrating an exemplary design layout.

For purposes of illustration, this inquiry and the response will be described below with respect to one specific feature, namely, a tapered fin-type FET (finFET) diffusion region (also referred to as a tapered finFET RX region). FIG. 2 is a diagram illustrating an exemplary design layout 200 with an isolation layer, a diffusion layer above the isolation layer, and a polysilicon layer above the diffusion layer. The isolation layer contains an isolation region shape 240. The diffusion layer contains a tapered finFET RX region shape 220, including a first portion 221 and a second portion 222 that is narrower than the first portion 221, and semiconductor fin shapes 230 in the first and second portions 221-222. The polysilicon layer contains polysilicon gate shapes 210 that traverse the semiconductor fin shapes 230 and the first portion 221 and second portion 222 of the tapered finFET RX region shape 220.

In response to the inquiry, the design information and, particularly, the list of current design rules for the new technology node can be accessed (e.g., by the processor) and a design rule checking process can be performed (106)-(108). That is, the layout of the feature at issue (e.g., design layout 200 of FIG. 2) can be analyzed (e.g., by the processor) to determine whether it complies with all of the current design rules specified in the PDK. If the layout complies with all of the current design rules (i.e., passes design rule checking), then the PDK can be updated to incorporate the feature (122) and the user can be notified that the feature will be manufacturable by the tools available in new technology node. However, when the layout fails to comply with one or more of the current design rules in the PDK, the following processes can be performed (e.g., by the processor) in order to determine whether the feature can be incorporated, as designed, into an updated PDK (e.g., by adjusting one or more of the current process assumptions and/or one or more of the current design rules), whether the feature requires redesign to be incorporated into either the current PDK or an updated PDK, or whether the feature simply is not manufacturable by the tools available in the new technology node and, thus, can not be incorporated into either the current PDK or an updated PDK.

Specifically, in the methods, when the layout fails to comply with one or more of the current design rules in the PDK, one or more fail mechanisms associated with the design rule(s) at issue and one or more process assumptions associated with each selected fail mechanism can be selected (110). That is, for each design rule at issue (i.e., each design rule for which the layout failed), all fail mechanisms that can occur as a result of a violation of the design rule can be identified and sorted based on probability of occurrence given the violation of the design rule (e.g., from most likely to occur to least likely to occur). Then, a predetermined number N (e.g., one or more) of the listed fail mechanisms that are most likely to occur given the violation of the design rule at issue can be selected. Additionally, for each fail mechanism selected, all process assumptions that contribute to a fail rate associated with that fail mechanism can be identified and sorted based on contribution to the fail rate. Then, a predetermined number M (e.g., one or more) of the processes assumptions with a highest contribution amount to the fail rate can be selected.

Figure 3:
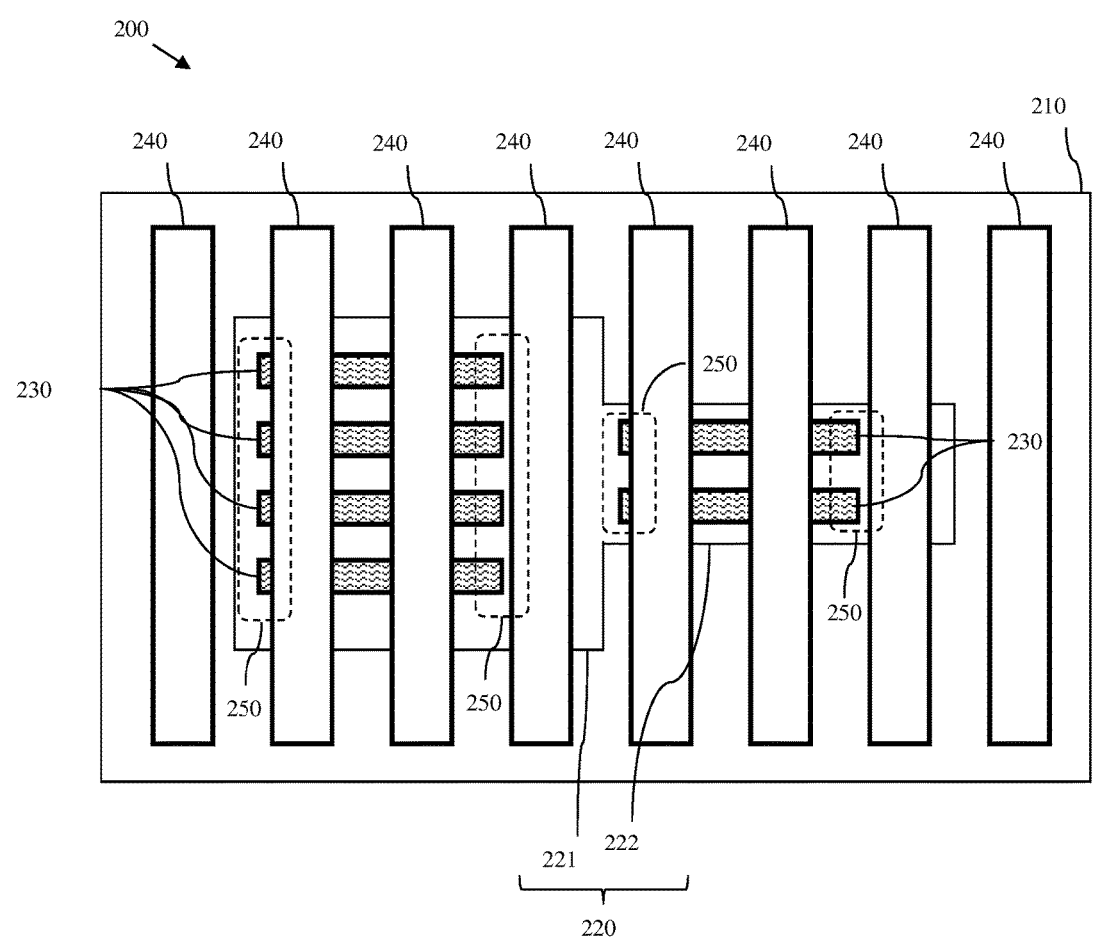
FIG. 3 is a diagram illustrating a fail mechanism in the design layout of FIG. 2.

For example, with respect to the design layout 200, a determination may be made that the finFET tapered RX region shape does not comply with the following current design rules: (1) RX.EX.FC.1 (also referred to herein as RX c-past FC) by Xnm (i.e., the RX shape must extend past the FC shapes by a specified number of nanometers); and (2) FC.EN.PC (i.e., the FC shapes must end immediately adjacent to and, preferably, below the PC such that the FC shape ends are covered by PC shapes). The fail mechanisms that can occur as a result of violations of the above-mentioned design rules (1) and (2) include, but are not limited to, the following: (1) the semiconductor fin shapes 230 having ends 250 that are not covered by the polysilicon gate shapes 240 (as shown in FIG. 3), (2) defects, etc. Of these fail mechanisms, the fail mechanism of the semiconductor fin shapes 230 having ends 250 that are not covered by polysilicon gate shapes 240 can, for example, be identified as the most likely fail mechanism to occur. Thus, this fail mechanism can be selected for further analysis. The current process assumptions that contribute to a fail rate associated with the fail mechanism of the semiconductor fin shapes 230 having ends that are uncovered by polysilicon gate shapes 240 include, but are not limited to, the following: (1) RX corner rounding radius (also referred to herein as RX_el CR), (2) FC corner rounding radius (also referred to herein as FC-CR), (3) alignment overlay (also referred to herein as FC/PC/RX overlay), and (4) PC exposure bias (also referred to herein as PC bias). Of these current process assumptions, the process assumption of PC bias can be identified as being the highest contributor to the fail rate associated with the semiconductor fin shapes 230 having ends 250 that are not covered by the polysilicon gate shapes 240 and, thus, can be selected for further processing. For purposes of this disclosure, it should be understood that the design rules referenced above apply to the different levels of shapes in the IC design layout and, in this exemplary case where the IC design layout is specific to a finFET structure: RX refers to the active device region shape, FC refers to semiconductor fin shapes and PC refers to polysilicon gate conductor shapes.

Next, multiple different images of the feature at issue can be generated with (i.e., showing) different tolerances for and between the various shapes in the different levels of the design layout given the selected process assumption(s) (112). The different tolerances shown in the different images can be, for example, different shape-to-shape spacing amounts in each of the different design levels. The different tolerances shown in the different images can also be, for example, different shape widths, different shape lengths, different shape areas, different shape orientations and/or different corner rounding radiuses (CRR) of the shapes in the different design levels. The different tolerances shown in the different images can also be, for example, different overlap amounts between the shapes in the different design levels, different coverages of the shapes in the different design levels, and/or different angles of intercept.

Figure 4:
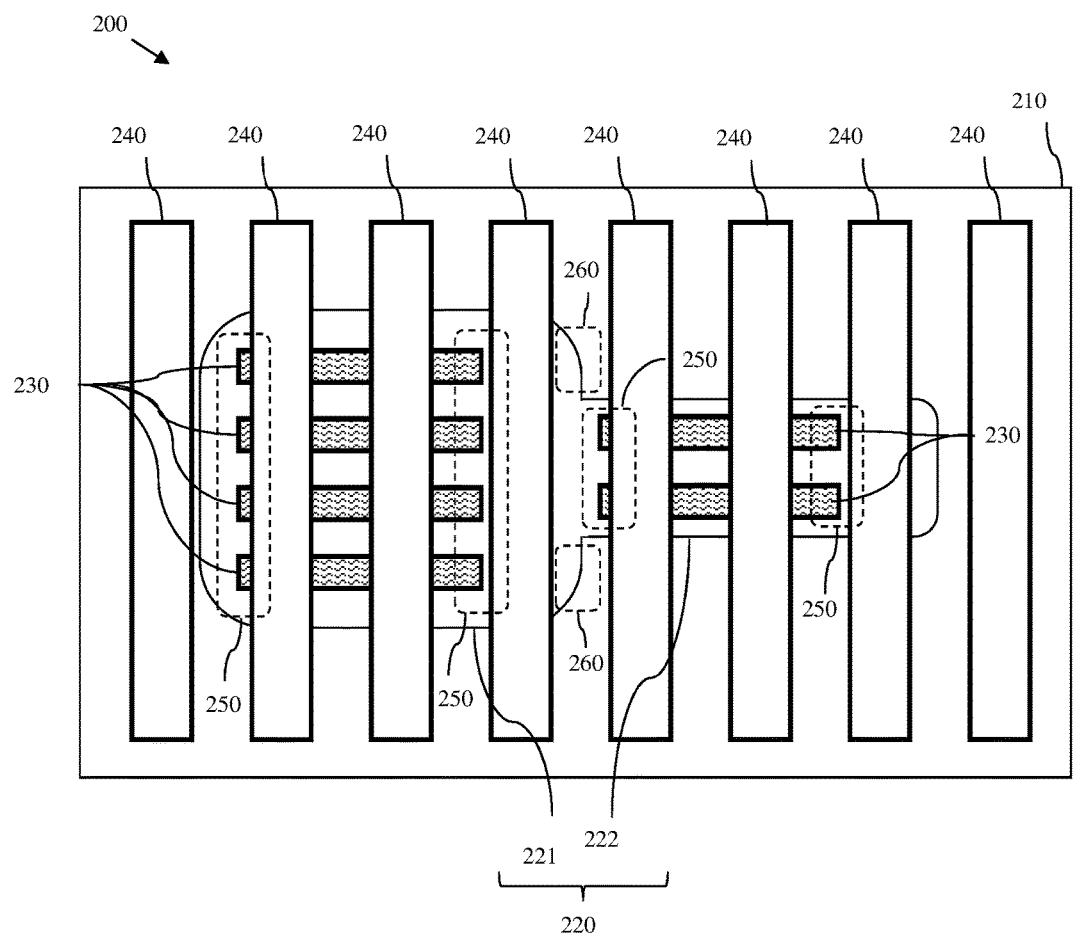
FIG. 4 is a diagram illustrating a critical dimension that leads to the fail mechanism shown in FIG. 3.

For example, referring to FIG. 4, the corner rounding radius (CRR) 260 of the tapered finFET RX region shape 220 is known to be critical dimension that can lead to the semiconductor fin shapes 230 having ends 250 that are uncovered by polysilicon gate shapes 240 and variations in the CRR are known to be a function of the PC bias. Thus, the different images generated at process 112 can illustrate different CCRs given different PC biases.

Next, the images can be analyzed (i.e., by performing statistical analyses, such as Monte-Carlo simulations, of the images) (114). Specifically, for each iteration of the MC Simulation, a normally distributed value of the variant is selected within the range of each variant. These values are then used to adjust the layout so that a direct measurement of the fail criteria can be measured.

Based on the results of the statistical analyses, the selected process assumption(s) and/or the design rule(s) at issue can be adjusted (i.e., changed) using a co-optimization process (116). That is, combinations of adjustments to the selected process assumption(s) and the design rule(s) at issue can be proposed and iteratively evaluated (e.g., by repeating processes 108-114) in order to find that optimal combination of process assumption and design rule adjustments that is practically available (e.g., as indicated by the results of the statistical analyses) and that achieves the lowest occurrence of the selected fail mechanism(s).

In one implementation of a solution, a PA such as overlay may be tightened to reduce/remove exposure to the fail criteria observed during the MC. In another solution, the GR value may be increased to prevent the geometry from being created during design.

Once the selected process assumption(s) and/or the design rule(s) at issue are adjusted and a determination is made that the feature will pass subsequent design rule checking given the adjusted process assumption(s) and/or adjusted design rule(s), the feature at issue and any adjusted design rules can be incorporated (e.g., by the processor) into an updated process design kit (PDK) for the new technology node. That is, the PDK for the new technology node can be updated to incorporate the feature and any adjusted design rules (122). The updated PDK can then be used to process subsequent inquiries regarding other features.

It should be noted that if, during the co-optimization process, the feature at issue is not able to pass subsequent design rule checking even given the proposed combination of adjustments to the selected process assumption(s) and the design rule(s) at issue, the design of the feature itself and, particularly, the layout of the design can be adjusted (i.e., changed) in an attempt to allow for incorporation of the feature into the PDK or an updated PDK for the new technology node (118). That is, the feature at issue can be redesigned, a new layout depicting the redesigned feature can be produced and the processes described above can be iteratively repeated for this new layout of the feature. However, if the feature, as redesigned, is not able to pass subsequent design rule checking given any proposed combination of adjustments to the selected process assumption(s) and the design rule(s) at issue or, if redesign is not practical, then the feature may ultimately be disqualified from use in the PDK for the new technology node (120).

Figure 5:
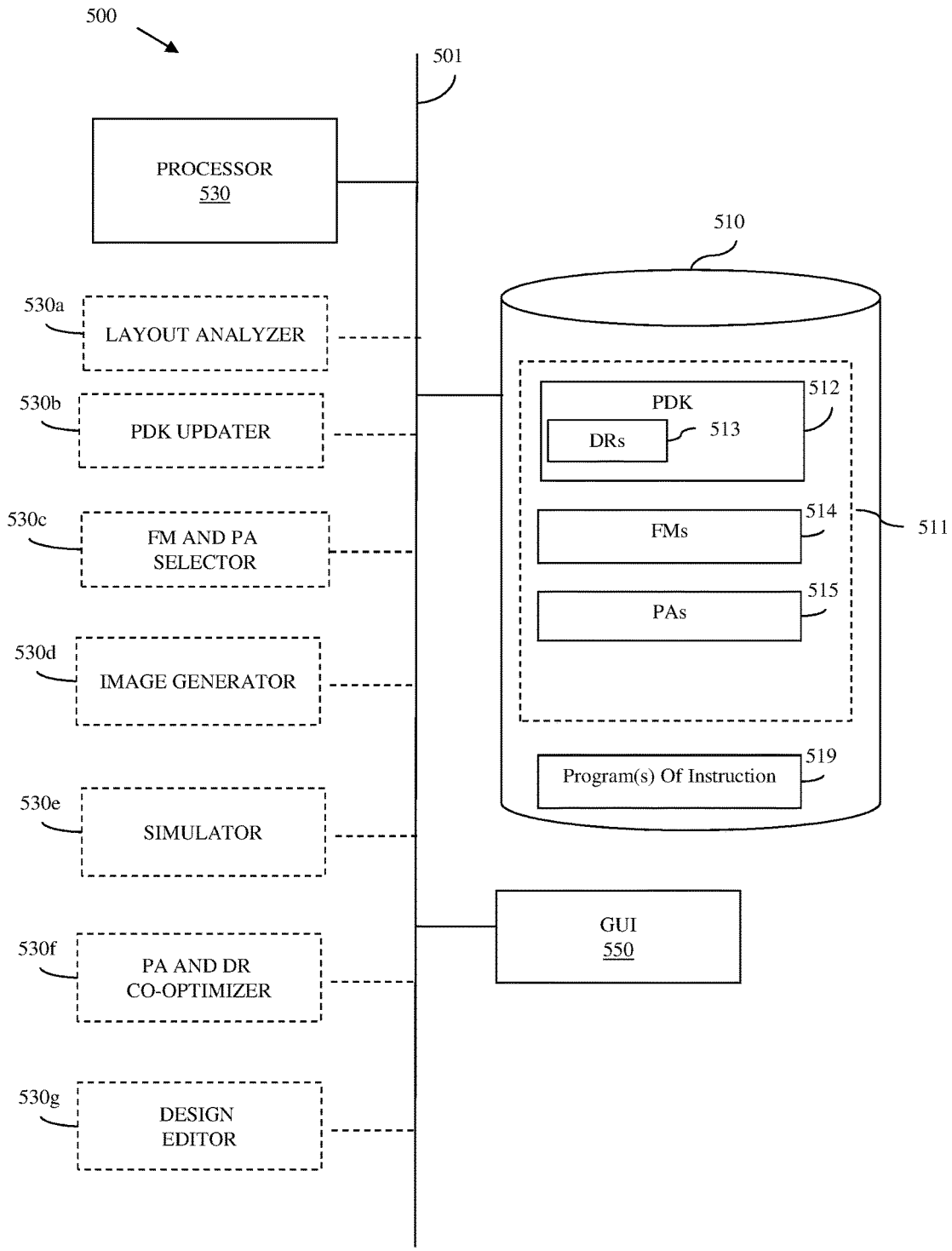
FIG. 5 is a schematic diagram illustrating the disclosed design systems that, during new technology node development, perform design rule and process assumption co-optimization using feature-specific layout-based statistical analyses.

Referring to FIG. 5, also disclosed herein are design systems 500 that, during new technology node development, perform design rule and process assumption co-optimization using feature-specific layout-based statistical analyses. Each system 500 can be a computer-aided design (CAD) system and, specifically, can incorporate at least one memory 510 (e.g., at least one computer readable storage medium, such as a computer readable storage device), a user interface 550 (e.g., a graphic user interface (GUI)) and at least one processor (e.g., 530 or 530a-f). For example, the system 500 can incorporate a single specialized processor 530 (e.g., a single specialized computer processing unit) that performs (i.e., that is adapted to perform, that is configured to perform and/or that executes program(s) of instructions to perform) multiple process steps, as described in detail below. Alternatively, the system 500 can incorporate multiple specialized processors 530a-g (e.g., multiple different specialized computer processing units), wherein each processor can perform (i.e., can be adapted to perform, can be configured to perform and/or can execute one or more special programs of instructions to perform) one or more of the multiple process steps, as described in detail below. For purposes of illustration, seven different special purpose processors are shown in FIG. 5 including a layout analyzer 530a, a process design kit (PDK) updater 530b, a fail mechanism (FM) and process assumption (PA) selector 530c, an image generator 530d, a simulator 530e, a PA and design rule (DR) co-optimizer 530f and a design editor 530g. It should be understood that FIG. 5 is not intended to be limiting and, alternatively, the multiple process steps, as described in detail below, can be performed by any number of one or more processors. In any case, the various components of the system 500, including the processor(s), memory(ies) and GUI, can be interconnected over a system bus 501, as illustrated. Alternatively, any one or more of the components of the system 500 can communicate with any other component over a wired or wireless network.

The memory 510 can store program(s) 519 of instructions for performing the various process steps, as described in detail below. The memory 510 can further store design information 511 for a new technology node. This design information 511 can include a list of fail mechanisms 514 and a list of current process assumptions 515 for the new technology node. As discussed above, process assumptions can include, but are not limited to, minimum and maximum dimensions for each layer in a gate stack, minimum and maximum dimensions for each dielectric layer, minimum and maximum dimensions for each conductive layer, etc. Process assumptions can also include estimations for the overlay accuracy of the alignment tools used in the masking process. The fail mechanisms (i.e., the conditions that can lead to fails) can include, but are not limited to, a less than minimum required insulation for a shape, shapes touching that should not touch or shapes not touching that should touch, shapes being covered or not be covered, the overlap area of shapes being too great or too small, the angles of the shape surfaces being too great or too small, etc. The lists of fail mechanisms and current process assumptions 514-515 can initially be determined, for example, based on corresponding lists of fail mechanisms and process assumptions available for a previous technology node. The design information 511 can also include a process design kit (PDK) 512, which incorporates current design rules 513 that have been established for the new technology node based on the previously mentioned lists of fail mechanisms 514 and current process assumptions 514. Those skilled in the art will recognize that a PDK also typically includes various other sets of files including, but not limited to, technology files for the new technology node and a library element library. The library element library can list multiple different library elements (also referred to as cells or standard cells) that can be incorporated into an IC under design in the specific technology node and, specifically, can contain library files (.libs) for each of those library elements. A given library element can represent a single device with specific features or can represent a set of devices with specific features and the interconnect structure(s) that connect those devices.

The system 500 can, through the user interface 550, receive an inquiry from a user (e.g., a designer) regarding the manufacturability of a specific feature in the new technology node. The inquiry can identify the specific feature. The specific feature can be defined (i.e., represented) in the inquiry by a layout containing multiple shapes at different design levels. The inquiry can further ask if the specific feature will be able to be incorporated into an integrated circuit (IC) design in the new technology node (i.e., can ask if the PDK for the new technology allows for incorporation of the specific feature into an IC design).

In response to the inquiry, the processor 530 (or, if applicable, the layout analyzer 530a) can, in response to the inquiry, access the design information 511 from the memory 510 and perform (i.e., can be adapted to perform, can be configured to perform, can execute a program 519 of instructions to perform, etc.) a design rule checking process. That is, the layout of the feature at issue can be analyzed to determine whether it complies with all of the current design rules 513 specified in the PDK 512. If the layout complies with all of the current design rules 513 (i.e., passes design rule checking), then the processor 530 (or, if applicable, the PDK updater 530b) can update (i.e., can be adapted to update, can be configured to update, can execute a program 519 of instructions to update, etc.) the PDK to incorporate the feature and store the updated PDK in the memory 510. The user can also be notified, through the user interface 550, that the feature will be manufacturable by the tools available in new technology node. However, when the layout fails to comply with one or more of the current design rules 513 in the PDK 512, processor(s) can perform additional processes in order to determine whether the feature can be incorporated, as designed, into an updated PDK (e.g., by adjusting one or more of the current process assumptions and/or one or more of the current design rules), whether the feature requires redesign to be incorporated into either the current PDK or an updated PDK, or whether the feature simply is not manufacturable by the tools available in the new technology node and, thus, can not be incorporated into either the current PDK or an updated PDK.

Specifically, when the layout fails to comply with one or more of the current design rules 513 in the PDK 512, the processor 530 (or, if applicable, the FM and PA selector 530c) can select (i.e., can be adapted to select, can be configured to select, can execute a program 519 of instructions to select, etc.) one or more fail mechanisms associated with the design rule(s) at issue and one or more process assumptions associated with each selected fail mechanism can be selected. Specifically, for each design rule at issue (i.e., each design rule for which the layout failed), all fail mechanisms that can occur as a result of a violation of the design rule can be identified and sorted based on probability of occurrence given the violation of the design rule (e.g., from most likely to occur to least likely to occur). Then, a predetermined number N (e.g., one or more) of the listed fail mechanisms that are most likely to occur given the violation of the design rule at issue can be selected. Additionally, for each fail mechanism selected, all process assumptions that contribute to a fail rate associated with that fail mechanism can be identified and sorted based on contribution to the fail rate. Then, a predetermined number M (e.g., one or more) of the processes assumptions with a highest contribution amount to the fail rate can be selected.

Next, the processor 530 (or, if applicable, the image generator 530d) can generate multiple different images of the feature at issue such that the images illustrate (i.e., show) different tolerances for and between the various shapes in the different levels of the design layout given the selected process assumption(s). The different tolerances shown in the different images can be, for example, different shape-to-shape spacing amounts in each of the different design levels. The different tolerances shown in the different images can also be, for example, different shape widths, different shape lengths, different shape areas, different shape orientations and/or different corner rounding radiuses (CRR) of the shapes in the different design levels. The different tolerances shown in the different images can also be, for example, different overlap amounts between the shapes in the different design levels, different coverages of the shapes in the different design levels, and/or different angles of intercept.

The processor 530 (or, if applicable, the simulator 530e) can then analyze the images (i.e., can be adapted to analyze the images, can be configured to analyze the images, can execute a program 519 of instructions to analyze the images, etc.) and, more specifically, can perform statistical analyses of the images (e.g., in the form of Monte-Carlo simulations).

Based on the results of the statistical analyses, the processor 530 (or, if applicable, the PA and DR optimizer 5300 can adjust (i.e., can be adapted to adjust, can be configured to adjust, can execute a program 519 of instructions to adjust, etc.) the selected process assumption(s) and/or the design rule(s) at issue using a co-optimization process. That is, combinations of adjustments to the selected process assumption(s) and the design rule(s) at issue can be proposed by the processor 530 (or, if applicable, the PA and DR optimizer 5300 and iteratively evaluated using the processes described above in order to find that optimal combination of process assumption and design rule adjustments that is practically available (e.g., as indicated by the results of the statistical analyses) and that achieves the lowest occurrence of the selected fail mechanism(s).

Once the selected process assumption(s) and/or the design rule(s) at issue are adjusted and a determination is made that the feature will pass subsequent design rule checking given the adjusted process assumption(s) and/or adjusted design rule(s), the processor 530 (or, if applicable, the PDK updater 530b) can incorporate the feature at issue and any adjusted design rules can be incorporated into an updated process design kit (PDK) for the new technology node. That is, the processor 530 (or, if applicable, the PDK updater 530b) can update the PDK for the new technology node so that it incorporates the feature and any adjusted design rules.

It should be noted that if, during the co-optimization process, the feature at issue is not able to pass subsequent design rule checking even given the proposed combination of adjustments to the selected process assumption(s) and the design rule(s) at issue, the processor 530 (or, if applicable, the design editor 530g) can adjust (i.e., can be adapted to adjust, can be configured to adjust, can execute a program 519 of instructions to adjust, etc.) the design of the feature itself and, particularly, the layout of the design in an attempt to allow for incorporation of the feature into the PDK or an updated PDK for the new technology node. That is, the feature at issue can be redesigned, a new layout depicting the redesigned feature can be produced and the processes described above can be iteratively repeated for this new layout of the feature. However, if the feature, as redesigned, is not able to pass subsequent design rule checking given any proposed combination of adjustments to the selected process assumption(s) and the design rule(s) at issue or, if redesign is not practical, then the feature may ultimately be disqualified from use in the PDK for the new technology node.

Also disclosed herein are computer program products that, during new technology node development, perform design rule and process assumption co-optimization using feature-specific layout-based statistical analyses. Specifically, the computer program products can be implemented on a computer readable storage medium having program instructions tangibly embodied thereon. The program instructions can be executable by at least one processor to perform the above-described method.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, wherein the instructions are executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
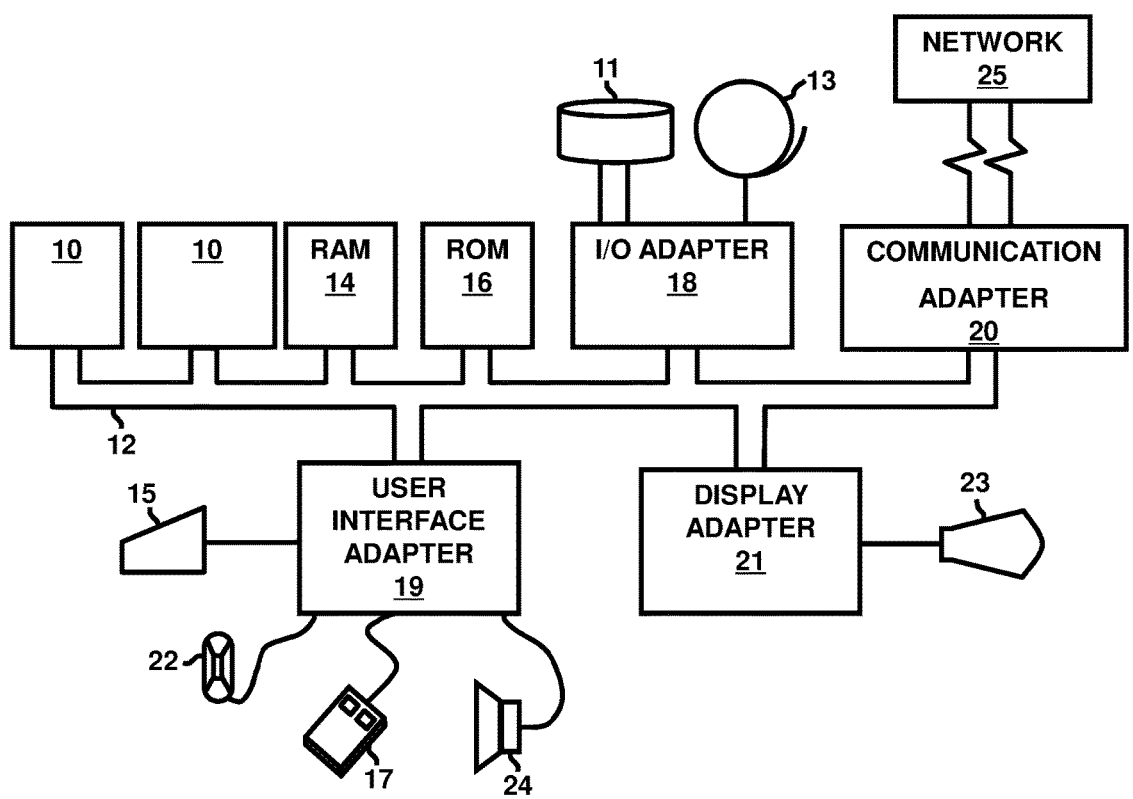
FIG. 6 is a representative hardware environment for implementing the methods, systems and computer program products disclosed herein.

A representative hardware environment (i.e., a computer system) for implementing the methods, systems and computer program products described above is illustrated in FIG. 6. This schematic drawing illustrates a hardware configuration of an information handling/computer system in accordance with the embodiments herein. The system incorporates at least one processor or central processing unit (CPU) 10. The CPUs 10 are interconnected via a system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the terminology used herein is for the purpose of describing the disclosed methods, systems and computer program products and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "on", "in direct contact", "abutting", "directly adjacent to", etc., are intended to indicate that at least one element physically contacts another element (without other elements separating the described elements). The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Therefore, disclosed above are methods, systems and computer program products that, during new technology node development, perform design rule and process assumption co-optimization using feature-specific layout-based statistical analyses. Specifically, the layout of a given feature can be analyzed to determine whether it complies with all of the currently established design rules in the new technology node. When the layout fails to comply with a current design rule, statistical analyses (e.g., Monte-Carlo simulations) of images, which are generated based on the layout and which illustrate different tolerances for and between the various shapes in the layout given current process assumption(s), can be performed. Based on the results of the analyses, the current process assumption(s) and/or the design rule itself can be adjusted using a co-optimization process in order to ensure the manufacturability of the feature within the technology.

What is claimed is:

1. A method comprising:
   receiving, by a processor from a user through a user interface, an inquiry regarding a feature, the feature being defined in a layout comprising multiple shapes;
   accessing, by the processor from a memory, process assumptions for a first technology node and design rules for a second technology node, the second technology node being newer than the first technology node and the process assumptions for the first technology node being used in the method as initial process assumptions for use during development of the second technology node;
   analyzing, by the processor, the layout to determine whether the layout complies with all of the design rules; and,
   when the layout fails to comply with at least one design rule, performing, by the processor, the following:
   selecting at least one fail mechanism associated with the design rule and at least one process assumption associated with the selected fail mechanism; generating multiple different images of the feature with different tolerances for and between the shapes given the selected process assumption; analyzing the images; and based on results of the analyzing, adjusting at least one of the selected process assumption for the second technology node and the design rule.

2. The method of claim 1, the analyzing comprising performing statistical analyses of the images.

3. The method of claim 2, the performing of the statistical analyses of the images comprising performing Monte-Carlo simulations of the images.

4. The method of claim 1, the shapes being in different design levels and the different tolerances comprising different shape-to-shape spacing amount in the different design levels.

5. The method of claim 1, the shapes being in different design levels and the different tolerances comprising any of the following:
different shape widths, different shape lengths, and different shape areas in the different design levels; and
different overlap amounts, different coverages, and different angles of intercept.

6. The method of claim 1, further comprising, before the adjusting, performing a co-optimization process wherein combinations of adjustments to the selected process assumption and the design rule are iteratively evaluated to determine an optimal combination of process assumption and design rule adjustments to achieve a lowest occurrence of the selected fail mechanism.

7. The method of claim 1, wherein, prior to the adjusting, a process design kit for the second technology node does not include the feature and wherein the method further comprises, following the adjusting, updating the process design kit for the second technology node to include the feature.

8. The method of claim 1, the selecting of the at least one fail mechanism comprising:
identifying all fail mechanisms that can occur as a result of a violation of the design rule; and,
sorting the fail mechanisms based on probability of occurrence given the violation of the design rule, the selecting of the at least one fail mechanism comprising selecting a predetermined number N of the fail mechanisms that are most likely to occur given the violation of the design rule.

9. The method of claim 8, the selecting of the at least one process assumption comprising:
identifying all process assumptions that contribute to a fail rate associated with each fail mechanism selected; and,
sorting the process assumptions based on contribution to the fail rate, the selecting of the at least one process assumption comprising selecting a predetermined number M of the processes assumptions with a highest contribution amount.

10. A system comprising:
a memory storing process assumptions for a first technology node and design rules for a second technology node, the second technology node being newer than the first technology node and the process assumptions for the first technology node being used in the method as initial process assumptions for use during development of the second technology node;
a user interface receiving, from a user, an inquiry regarding a feature, the feature being defined in a layout comprising multiple shapes; and,
at least one processor in communication with the user interface and the memory,
the processor analyzing the layout to determine whether the layout complies with all of the design rules and, when the layout fails to comply with at least one design rule, the processor selecting at least one fail mechanism associated with the design rule and at least one process assumption associated with the selected fail mechanism; generating multiple different images of the feature with different tolerances for and between the shapes given the selected process assumption; analyzing the images; and based on results of the analyzing, adjusting at least one of the selected process assumption for the second technology node and the design rule.

11. The system of claim 10, the analyzing comprising performing statistical analyses of the images.

12. The system of claim 10, the analyzing comprising performing Monte-Carlo simulations.

13. The system of claim 10, the shapes being in different design levels and the different tolerances comprising different shape-to-shape spacing amount in the different design levels.

14. The system of claim 10, the shapes being in different design levels and the different tolerances comprising any of the following:
different shape widths, different shape lengths, and different shape areas in the different design levels; and
different overlap amounts, different coverages, and different angles of intercept.

15. The system of claim 10, wherein, before the adjusting, the processor performing a co-optimization process wherein combinations of adjustments to the selected process assumption and the design rule are iteratively evaluated to determine an optimal combination of process assumption and design rule adjustments to achieve a lowest occurrence of the selected fail mechanism.

16. The system of claim 10, wherein, prior to the adjusting, a process design kit for the second technology node does not include the feature and wherein the processor further updates the process design kit for the second technology node to include the feature following the adjusting.

17. The system of claim 10, the processor selecting the at least one fail mechanism by performing the following:
identifying all fail mechanisms that can occur as a result of a violation of the design rule; and,
sorting the fail mechanisms based on probability of occurrence given the violation of the design rule, the selecting of the at least one fail mechanism comprising selecting a predetermined number N of the fail mechanisms that are most likely to occur given the violation of the design rule.

18. The system of claim 17, the processor further selecting the at least one process assumption by performing the following:
identifying all process assumptions that contribute to a fail rate associated with each fail mechanism selected; and,
sorting the process assumptions based on contribution to the fail rate, the selecting of the at least one process assumption comprising selecting a predetermined number M of the processes assumptions with a highest contribution amount.

19. A computer program product comprising a computer readable storage medium having program instructions tangibly embodied thereon, the program instructions being executable by at least one processor to perform a method, the method comprising:

receiving, from a user through a user interface, an inquiry regarding a feature, the feature being defined in a layout comprising multiple shapes;

accessing, from a memory, process assumptions for a first technology node and design rules for a second technology node, the second technology node being newer than the first technology node and the process assumptions for the first technology node being used in the method as initial process assumptions for use during development of the second technology node;

analyzing the layout to determine whether the layout complies with all of the design rules; and, when the layout fails to comply with at least one design rule, performing the following:

selecting at least one fail mechanism associated with the design rule and at least one process assumption associated with the selected fail mechanism;

generating multiple different images of the feature with different tolerances for and between the shapes given the selected process assumption;

analyzing the images; and based on results of the analyzing, adjusting at least one of the selected process assumption for the second technology node and the design rule.

20. The computer program product of claim 19, wherein the analyzing comprise performing Monte-Carlo simulations of the images, wherein, prior to the adjusting, a process design kit for the second technology node does not include the feature and wherein the method further comprises, following the adjusting, updating the process design kit for the second technology node to include the feature.

* * * * *